(12) United States Patent
Smorgon et al.

(10) Patent No.: US 10,739,278 B2
(45) Date of Patent: Aug. 11, 2020

(54) CONTACT LENS DEFECT INSPECTION USING UV ILLUMINATION

(71) Applicant: EMAGE VISION PTE. LTD, Singapore (SG)

(72) Inventors: Sergey Smorgon, Singapore (SG); Bee Chuan Tan, Singapore (SG)

(73) Assignee: EMAGE VISION PTE. LTD, Singapore (SG)

( * ) Notice: Subject to any disclaimer, the term of this patent is extended or adjusted under 35 U.S.C. 154(b) by 500 days.

(21) Appl. No.: 15/355,595

(22) Filed: Nov. 18, 2016

(65) Prior Publication Data
US 2017/0138867 A1 May 18, 2017

(30) Foreign Application Priority Data
Nov. 18, 2015 (SG) .......................... 10201509497V

(51) Int. Cl.
| | | |
|---|---|---|
| *G01M 11/02* | (2006.01) | |
| *H04N 7/18* | (2006.01) | |
| *G01N 21/958* | (2006.01) | |
| *G06T 7/00* | (2017.01) | |

(Continued)

(52) U.S. Cl.
CPC ....... *G01N 21/958* (2013.01); *G01M 11/0278* (2013.01); *G01N 21/64* (2013.01); *G06T 7/0004* (2013.01); *H04N 5/2256* (2013.01); *H04N 7/183* (2013.01); *G01N 2021/646* (2013.01); *G01N 2021/6417* (2013.01); *G01N 2021/9583* (2013.01); *G06T 2207/10004* (2013.01); *G06T 2207/10024* (2013.01);

(Continued)

(58) Field of Classification Search
CPC .......................... G01N 21/958; H04N 5/2256
See application file for complete search history.

(56) References Cited

U.S. PATENT DOCUMENTS

| | | | |
|---|---|---|---|
| 3,981,593 A * | 9/1976 | Boyle ................ | G01M 11/0214 356/239.2 |
| 6,757,420 B2 * | 6/2004 | Krahn ................ | G01N 21/9508 250/223 B |

(Continued)

FOREIGN PATENT DOCUMENTS

| | | |
|---|---|---|
| JP | 2001215077 A | 8/2001 |
| JP | H3100654 | 8/2001 |

(Continued)

*Primary Examiner* — Irfan Habib
(74) *Attorney, Agent, or Firm* — King & Schickli, PLLC

(57) ABSTRACT

A system for detecting defects in a contact lens material comprising: a camera having a lens and a digital image output for inspecting said lens suspended in saline solution, wherein said camera's digital image output includes only the image produced by light in a color spectrum corresponding to a portion of the spectrum of light produced by fluorescent emission of said lens material; a first Ultra violet light source to illuminate said lens and excite fluorescent emission therein; a first filter to filter the emitted light from the lens which is illuminated by Ultra violet light; and a computer having an associated memory, an input for accepting the digital image output from said camera, and an output representative of an analyzed digital image wherein said analyzed digital image includes visible indications of any imperfections detected in said lens material.

4 Claims, 5 Drawing Sheets

(51) Int. Cl.
*G01N 21/64* (2006.01)
*H04N 5/225* (2006.01)
(52) U.S. Cl.
CPC .............. *G06T 2207/10064* (2013.01); *G06T 2207/30108* (2013.01); *G06T 2207/30164* (2013.01)

(56) References Cited

U.S. PATENT DOCUMENTS

| | | | |
|---|---|---|---|
| 2001/0016059 A1* | 8/2001 | Krahn | G01N 21/9508 382/141 |
| 2002/0146151 A1 | 10/2002 | Huston et al. | |
| 2003/0160343 A1* | 8/2003 | Hodgkinson | B29C 33/44 264/1.1 |
| 2003/0173525 A1* | 9/2003 | Seville | G01N 21/6428 250/458.1 |
| 2004/0042003 A1* | 3/2004 | Dispenza | G01M 11/0214 356/239.1 |
| 2006/0163491 A1* | 7/2006 | Angal | G01N 21/6456 250/458.1 |
| 2007/0139640 A1* | 6/2007 | Biel | G01M 11/02 356/124 |
| 2007/0206184 A1* | 9/2007 | Uto | G01N 21/21 356/237.2 |
| 2008/0204736 A1* | 8/2008 | Chikamatsu | G01N 21/9501 356/237.4 |
| 2011/0235339 A1* | 9/2011 | Shyu | B29D 11/00413 362/326 |
| 2013/0169955 A1* | 7/2013 | Vertoprakhov | G01M 11/0214 356/124 |
| 2014/0333760 A1* | 11/2014 | Vertoprakhov | G01N 21/8806 348/125 |
| 2015/0253257 A1* | 9/2015 | Lipscomb | G01N 21/8806 356/239.2 |
| 2016/0258880 A1* | 9/2016 | Smorgon | G01N 21/8806 |
| 2019/0072784 A1* | 3/2019 | Paulekuhn | G02C 7/04 |

FOREIGN PATENT DOCUMENTS

| | | |
|---|---|---|
| TW | 201005422 A | 2/2010 |
| WO | 9630745 A1 | 10/1996 |
| WO | 2005084121 A2 | 9/2005 |

* cited by examiner

CONTACT LENS DEFECT INSPECTION USING UV ILLUMINATION

FIELD OF THE INVENTION

The present invention relates to an apparatus for inspecting defects in Ophthalmic lenses suspended in containers filled with Saline solution. More specifically, the present invention relates to an apparatus and method to inspect the Ophthalmic lens quality using Ultraviolet illumination.

BACKGROUND OF THE INVENTION

The present invention relates to an inspection system in an automated production line. More particularly, the invention relates to a system and method of inspection of ophthalmic lens that are illuminated with ultraviolet light. The lenses are inspected in containers prior to the sealing process.

Ophthalmic lenses are packaged in small containers commonly called as blister packs. The containers typically contain a single ophthalmic lens submerged in saline solution. Prior art systems disclose inspection systems using LED illumination in the form of back light and front light. These type of inspection systems suffer from certain limitations in detecting very fine cracks, bubbles and edge defects in the lenses due to contaminated saline solution and bubbles in the solution that affects the quality of inspection and increases the inspection time significantly as the software has to perform more analysis of the image to differentiate between real and false defects. Furthermore, typical LED illumination systems have difficulty in highlighting deformities in the lens material, especially if the deformities are orientated along the axis of the illumination. Elaborate methods such as varying the illumination angle, changing the wavelength of the illumination combined with multiple images capturing have to be adopted to enable detailed analysis of different images to detect very fine defects. In spite of these additional painstaking steps to detect fine defects, there are instances, the inspection detects many good lenses as rejects which increases losses to the manufacturer. There are also instances wherein the inspection system accepts defective lenses as good, in which case the customer will encounter faulty lens.

It is a known phenomenon that certain fluorescent materials are capable of absorbing radiated electromagnetic energy in the near ultraviolet spectrum and emitting it at a longer wavelength in the visible spectrum of light. This phenomenon enables various inspection of objects comprising of fluorescent dyes or pigments, illuminated by an ultraviolet radiation source that will re-radiate with luminescence in the visible spectrum.

It is a well-known fact that fluorescent pigments or compounds are used during the manufacturing of contact lens. Typically fluorescent compounds were utilized so laboratories could identify and detect materials and prevent duplication and identify counterfeits of the base material used in the manufacture of Contact lens. Counterfeiting and substitution of lens materials and misleading advertising had become a common place. Fluorescence is a process of photo-luminescence by which light of short wavelengths, either in the ultraviolet or the visible regions of the electromagnetic spectrum, is absorbed and re-radiated at longer wavelengths. The re-emission occurs within the visible region of the light spectrum. The fluorescent compounds in the contact lens material exhibit the phenomenon of fluorescing under ultraviolet light. The fluorescent light emanating from the pigment in the contact lens material, is reflected within the polished optical surfaces of the lens and concentrated at the lens edge or any edge formed as a result of a defect or other deformity. The phenomena of fluorescing is especially pronounced at the edges of the material and where the material is broken or disrupted in its physical characteristics. No fluorescence is visible when the material is illuminated with standard LED illumination or Infra Red illumination. However the fluorescence is obvious when the same material is illuminated using ultraviolet illumination. Accordingly, defects such as voids, bubbles or cuts within the material will appear as bright (pixels) on the digital image captured by the camera, since little or no light in the fluorescent wavelength will be emitted from the section of the material representative of the defects. Accordingly, the present invention is particularly suited for detecting defects in pigmented lens material, even where those voids may be undetectable to the naked eye.

An apparatus and methods are needed that can produce consistently enhanced images of contact lenses suspended in saline solution, to enable reliable and robust detection of edge defects, breakages and bubbles in the lenses. This is the objective of the present invention.

SUMMARY OF INVENTION

The apparatus and method of the present invention address at least some of the difficulties seen in the prior art.

It is an object of the present invention to provide an apparatus for inspecting contact lenses suspended in Saline solution to inspect edges and any deformities within contact lenses. The invention provided constitutes a high resolution camera and a lens to capture high quality images of the contact lens which is illuminated with UV light. The UV light fundamentally excites the contact lens material or fluorescent pigments that exist within the contact lens material. The re-emitted light, which is of a longer wavelength in the visible spectrum passes through an appropriate filter to prevent the camera from picking up stray and other spectrum of light.

It is further an object of the present invention to provide an apparatus and method to utilize the phenomenon of irradiation under ultraviolet (365 nm) wavelength illumination, for inspection of contact lenses defects such as cuts, breakages and any deformities.

It is further an object of the present invention to provide an apparatus that is integrated with an UV LED based illumination module enabled for electronically controlling the illumination to emit light in short pulse at any given instance.

It is further an object of the present invention to provide an apparatus that is integrated with an UV LED based illumination module enabled for electronically controlling the intensity of the light to suit different inspection criteria.

It is further an object of the present invention to provide an apparatus to enable strobing of the UV LED based illumination module, to maintain a very consistent and stable intensity of light from one pulse to another.

In further an object of the present invention to provide an improved method of inspecting contact lenses wherein the lenses are illuminated with Ultraviolet light and images are captured using a specific wavelength color filter (For eg: of 542 nm) positioned in front of the Camera lens.

It is further an object of the present invention to provide an apparatus to capture high resolution images of the contact lens to enable enhanced analysis for detection of defects at the edges of the contact lens and within the area of the contact lens.

It is yet another aspect of the present invention to provide an apparatus for use as an inline inspection module that is easily integrated into an automated inspection system.

Other features and objects of the present invention will become apparent from the detailed description of the preferred embodiment(s) as well as the drawing figures included herein below.

BRIEF DESCRIPTION OF DRAWINGS

It will be convenient to further describe the present invention with respect to the accompanying drawings that illustrate possible arrangements of the invention. Person skilled in the art will appreciate that other arrangements of the invention are possible, and consequently the particularity of the accompanying drawings is not to be understood as superseding the generality of the preceding description of the invention.

DETAILED DESCRIPTION OF THE PREFERRED EMBODIMENT(S)

Figure 1:
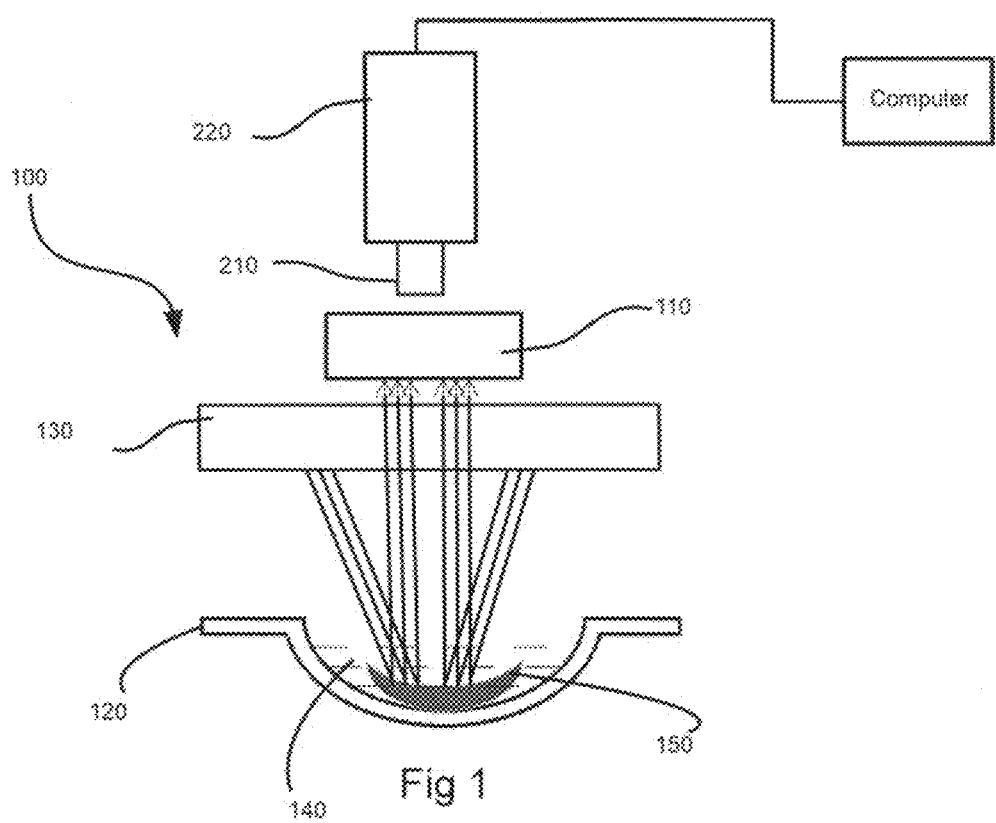
FIG. 1 shows an illustration of the optical and illumination system according to the present invention.

Referring to FIG. 1, and in accordance with a constructed embodiment of the present invention, a system 100 and method for detecting defects at the edges, bubbles and breakages and other deformities within the lens material includes a camera 220 having a lens 210 suitably integrated to a computer for analysis of the image captured by camera 220 as seen through the lens 210. The camera 220 may include an integral or detached illumination module 130 that emits ultraviolet light synchronously with the operation of a shutter or a strobe controlling electronics module (not shown), as is well known in the art.

Furthermore, in accordance with the present invention includes a first optical filter 110 is disposed over the lens 210 of the camera 220 thereof such that any light entering the lens 210 must first pass through the first optical filter 110. The first optical filter 110 is selected to block those wave lengths of light that include the wavelengths that excite the fluorescence of the contact lens 150, being inspected. Thus the camera 220 obtains an image that includes the light emitted through the effect of fluorescence but devoid of details from the spectrum of light rejected by the first optical filter 110. One of ordinary skill in the art will recognize that the placement of the first optical filter 110, whether in front of or behind the lens 210 of the camera 220, does not affect the operation of the present invention.

Additionally, the present invention may incorporate an ultraviolet (UV) light source 130, or alternatively a plurality thereof, disposed in an array around the lens 210 of the camera 220 in order to provide comprehensive UV light illumination of the inspection target at a plurality of incident angles. The UV light sources 130 may comprise a plurality of UV light emitting diodes (LEDs) emitting light at a wavelength sufficient to excite fluorescent emission in the contact lens 150 suspended in a saline solution 140 all of which are held in a container 120 being inspected. The container material 120 may include, but not limited to translucent or frosted plastic material.

In accordance with one embodiment of the present invention, the LEDs used to illuminate the contact lens may be selected to emit radiation in the spectrum required to excite fluorescent emission for a given lens material type. Accordingly, it is possible to either select a different optical filter to tailor the excitation light spectrum based on a UV LED array 210, or select an LED array to correspond to the requisite excitation light spectrum.

In a yet further embodiment of the present invention the UV LEDs based illumination module may be energized to emit light synchronously with the operation of the camera 220 in order to reduce the requisite electrical power required to operate the UV LEDs as well as extend the useful life of the LEDs as well as to eliminate smear in the image capture. This may be accomplished by utilizing a commercial electronic strobe controller (not shown) to deliver a programmed time pulse to the LED array synchronously with the camera 220 image acquisition process.

The camera 220 obtains an image that includes the light emitted by the lens 150 through the effect of fluorescence created as a result of the UV light source 130, but devoid of details from the spectrum of light rejected by the first optical filter 110.

Figure 2:
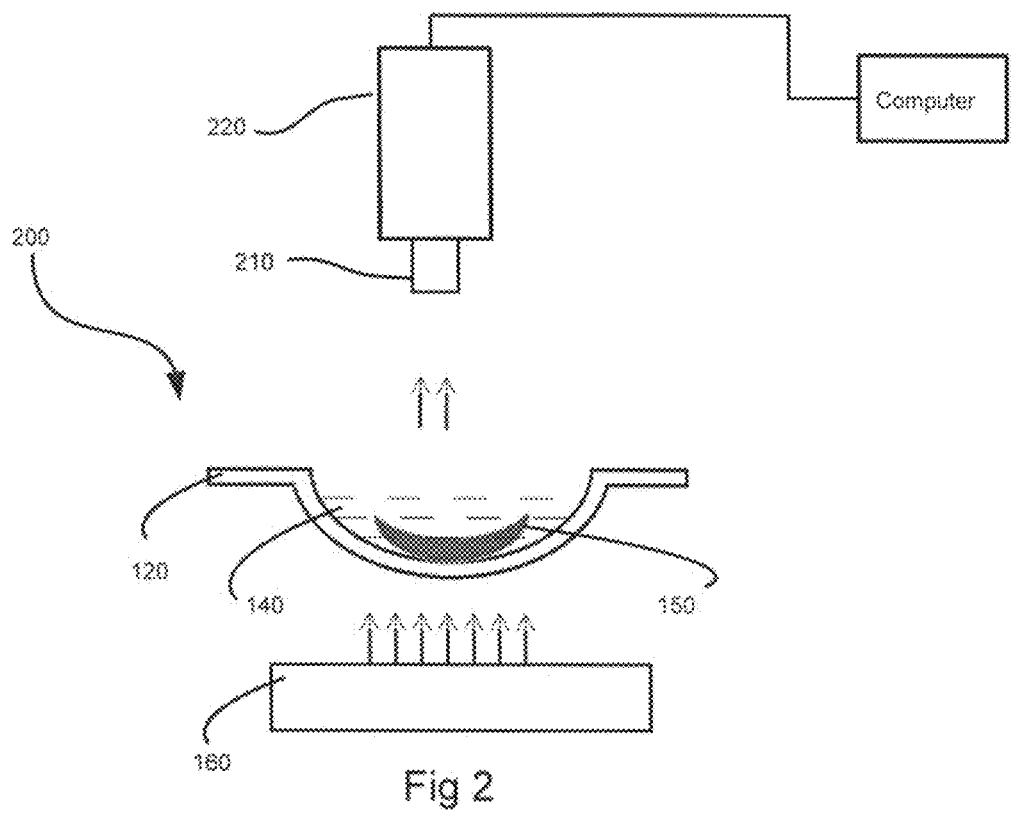
FIG. 2 shows an illustration of the optical and illumination system of prior art.

The apparatus in FIG. 2 relates to prior art commonly designed for inspecting defects in contact lenses. The apparatus 200 in FIG. 2 differs from the apparatus 100 of the present invention shown in FIG. 1, where in the backlight or common LED illumination 160 of FIG. 2 is positioned below the object of inspection 150 compared to the front light UV LED illumination 130 of FIG. 1 which is positioned on top of the object 150 to be inspected.

The foregoing detailed description of the embodiment(s) of the present invention is presented primarily for clearness of understanding and no unnecessary limitations are to be understood or implied therefrom. Modifications to the present invention in its various embodiment(s) will become obvious to those skilled in the art upon reading this disclosure and may be made without departing from scope of the invention encompassed by the claims appended hereto. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

In a preferred embodiment of the present invention several examples are described below.

Figure 3:
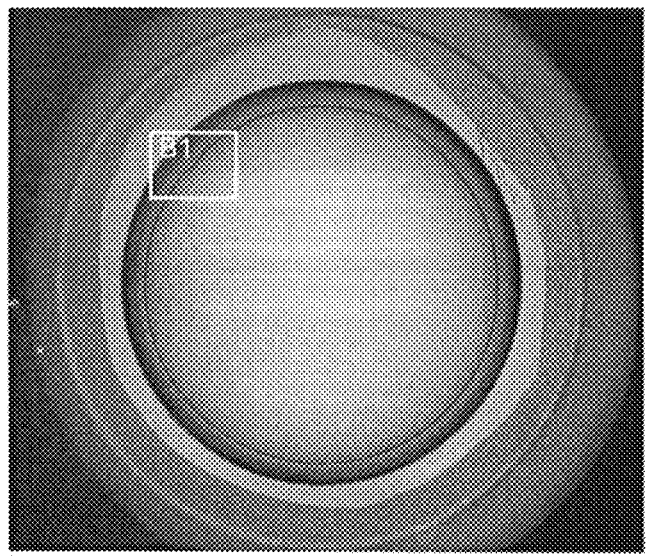
FIG. 3 shows an image of ophthalmic lens of a defective lens at the edge, captured using the inspection system in FIG. 2 that incorporates a standard LED illumination module.
Figure 4:
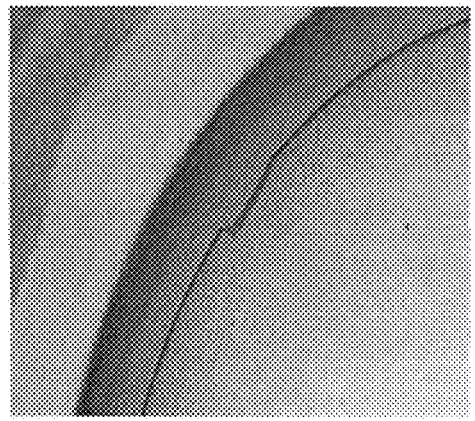
FIG. 4 shows an enlarged image of area B1 in FIG. 3.

FIG. 3 shows an image of an ophthalmic lens captured using apparatus 200 illustrated in FIG. 2. As evident in FIG. 3, a probable defect is seen in the form of a broken edge in the area shown by box B1. An enlarged image of the box B1 (FIG. 3) is shown in FIG. 4. The edge of the ophthalmic is seen as a Black edge with a small and insignificant break in the edge. Depending upon the inspection parameters, the edge in FIG. 4 may or may not be detected as a defect. This ambiguity may result in the Ophthalmic lens being inspected as a GOOD or BAD lens. More analysis may need to be done on the image which results in delayed inspection result.

Figure 5:
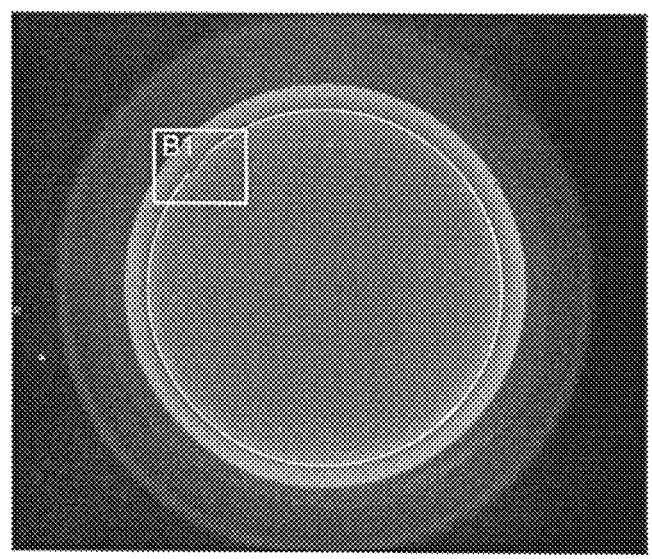
FIG. 5 shows an image of ophthalmic lens of a defective lens at the edge, captured using the inspection system in FIG. 1 that incorporates a Ultraviolet LED illumination module.
Figure 6:
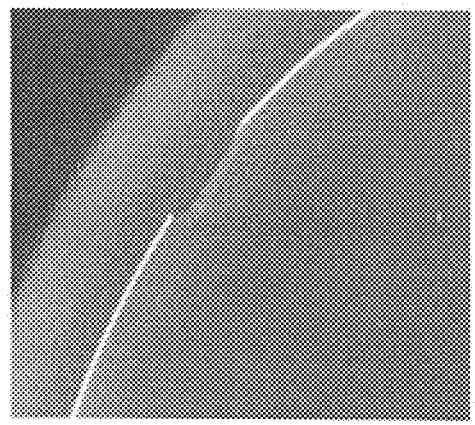
FIG. 6 shows an enlarged image of area B1 in FIG. 5.

FIG. 5 shows an image of the same ophthalmic lens of FIG. 3, but with the image captured using apparatus 100 as illustrated in FIG. 1. The area indicated by box B in FIG. 5 is shown enlarged in FIG. 6. The edge of the ophthalmic lens is seen as a white edge due to the florescence phenomenon when exposed to UV LED illumination utilized in apparatus 100. It is evident that the white circular line representing the edge of the ophthalmic lens shows a non-continuous white line, indicating a defect at the edge of the lens. Further analysis by the software, the break in the white line indicating the edge in FIG. 6 of the lens is accurately and consistently detected as a non-continuous edge.

Figure 7:
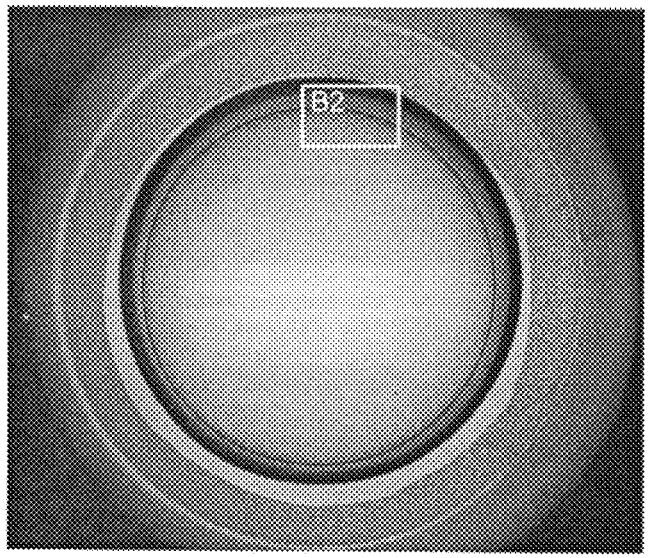
FIG. 7 shows an image of ophthalmic lens of a defective lens at the edge, captured using the inspection system in FIG. 2 that incorporates a standard LED illumination module.
Figure 8:
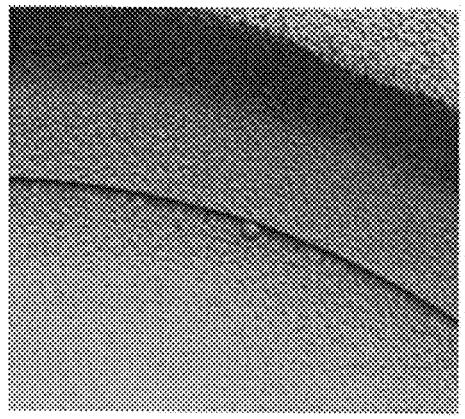
FIG. 8 shows an enlarged image of area B2 in FIG. 7.

FIG. 7 shows an image of an ophthalmic lens captured using apparatus 200 illustrated in FIG. 2. As evident in FIG. 7, a probable defect is seen in the form of a bubble within the lens material in the area shown by box B2. An enlarged image of the box B2 (FIG. 7) is shown in FIG. 8. The bubble is seen as a round defect with at the edge of the lens. Depending upon the inspection parameters, the bubble in FIG. 8 may or may not be detected as a defect. This ambiguity may result in the Ophthalmic lens being inspected as a GOOD or BAD lens. More analysis may need to be done on the image which results in delayed inspection result.

Figure 9:
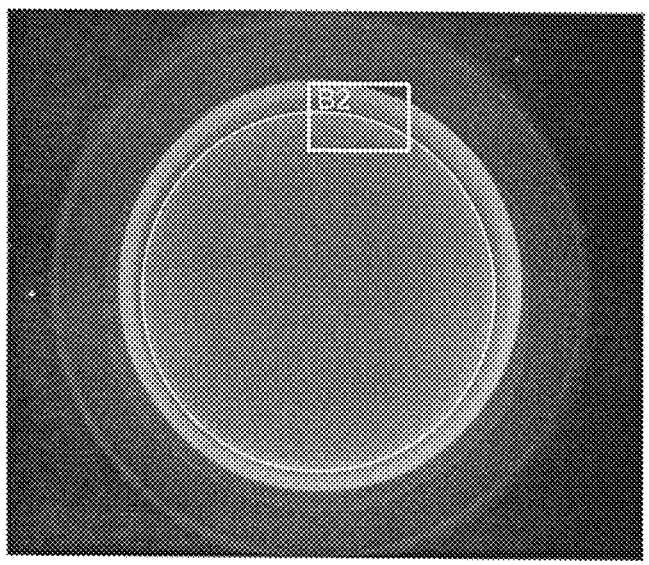
FIG. 9 shows an image of ophthalmic lens of a defective lens at the edge, captured using the inspection system in FIG. 1 that incorporates a Ultraviolet LED illumination module.
Figure 10:
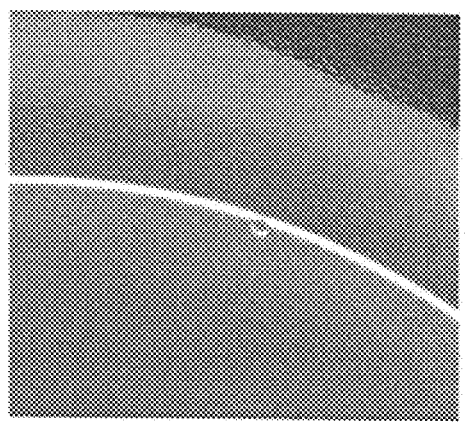
FIG. 10 shows an enlarged image of area B2 in FIG. 9.

FIG. 9 shows an image of the same ophthalmic lens of FIG. 7, but with the image captured using apparatus 100 as illustrated in FIG. 1. The area indicated by box B2 in FIG. 9 is shown enlarged in FIG. 10. The edge of the ophthalmic lens is seen as a white edge due to the florescence phenomenon when exposed to UV LED illumination utilized in apparatus 100. It is also evident that the semi-circular white circular line representing the edge of the bubble within the ophthalmic lens is very prominent and can be reliably and repeatedly detected. It is important to note that on further analysis by software algorithms, measurements such as diameter of the bubble, any foreign particle etc., is easily accomplished as the image is greatly enhanced.

Figure 11:
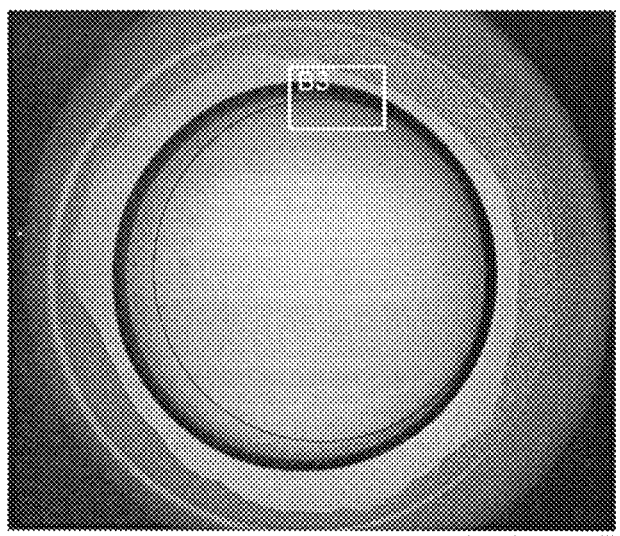
FIG. 11 shows an image of ophthalmic lens of a defective lens at the edge, captured using the inspection system in FIG. 2 that incorporates a standard LED illumination module.
Figure 12:
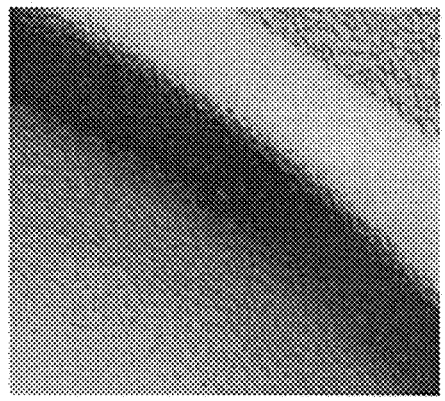
FIG. 12 shows an enlarged image of area B3 in FIG. 11.

FIG. 11 shows an image of an ophthalmic lens captured using apparatus 200 illustrated in FIG. 2. The contact lens is positioned at a spot in the container 120 wherein it coincides with the edge of the Saline solution. As evident in FIG. 11, a bubble defect is observed in the area B3. An enlarged image of the box B3 (FIG. 11) is shown in FIG. 12. A faint bubble is seen very close to the black edge of the lens and the Saline solution. The bubble is seen as a round defect with at the edge of the lens. Depending upon the inspection parameters, the bubble in FIG. 12 may or may not be detected as a defect. This ambiguity may result in the Ophthalmic lens being inspected as a GOOD or BAD lens. More analysis may need to be done on the image which results in delayed inspection result.

Figure 13:
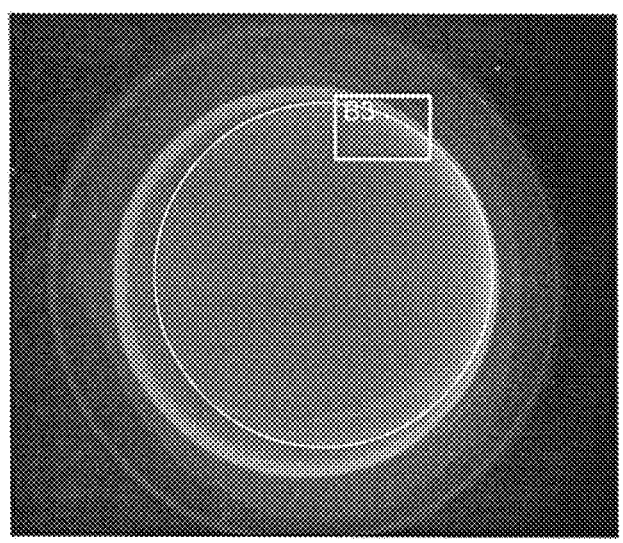
FIG. 13 shows an image of ophthalmic lens of a defective lens at the edge, captured using the inspection system in FIG. 1 that incorporates a Ultraviolet LED illumination module.
Figure 14:
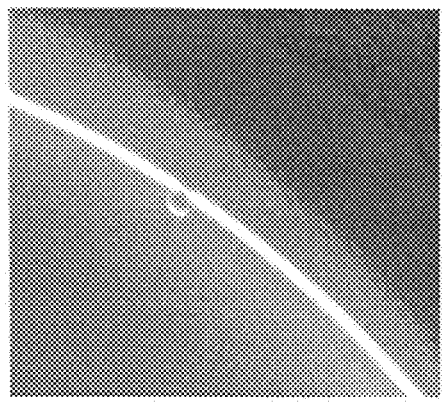
FIG. 14 shows an enlarged image of area B3 in FIG. 13.

FIG. 13 shows an image of the same ophthalmic lens of FIG. 11, but with the image captured using apparatus 100 as illustrated in FIG. 1. The area indicated by box B3 in FIG. 13 is shown enlarged in FIG. 14. The edge of the ophthalmic lens is seen as a white edge due to the florescence phenomenon when exposed to UV LED illumination utilized in apparatus 100. It is also evident that the semi-circular white circular line representing the edge of the bubble within the ophthalmic lens is significantly enhanced without merging into the Saline Solution background as observed in FIG. 12. The bubble in FIG. 14 is seamlessly detected by the analysis software and furthermore it is repeatedly and consistently located accurately to ensure assured quality of the inspected product.

Figure 15:
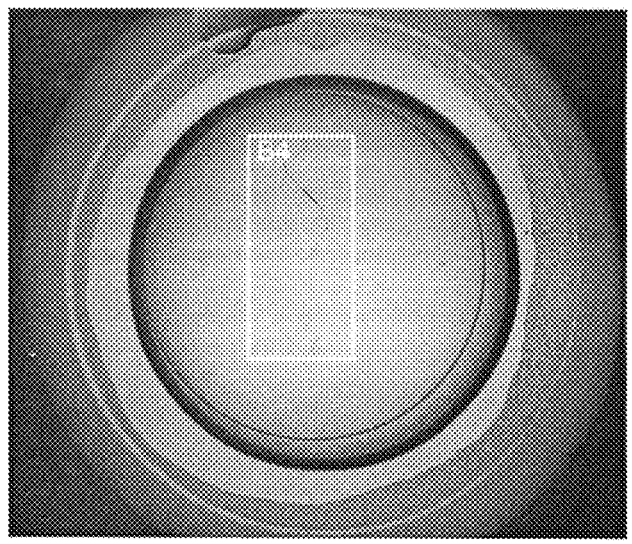
FIG. 15 shows an image of ophthalmic lens of a defective lens at the edge, captured using the inspection system in FIG. 2 that incorporates a standard LED illumination module.
Figure 16:
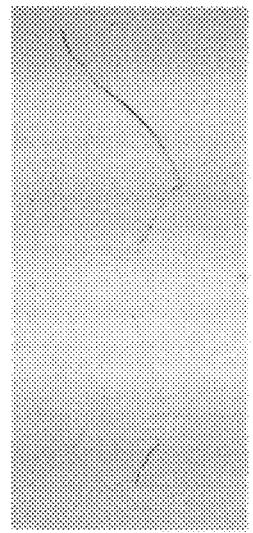
FIG. 16 shows an enlarged image of area B4 in FIG. 15.

FIG. 15 shows an image of an ophthalmic lens captured using apparatus 200 illustrated in FIG. 2. As observed in FIG. 15, a probable crack defect is seen in the box area B4. An enlarged image of the box B4 (FIG. 15) is shown in FIG. 16. Some parts of the area in B4 shows a dark line which is discontinuous in certain parts and faint in other parts. Inspection of this defect can yield unreliable results.

Figure 17:
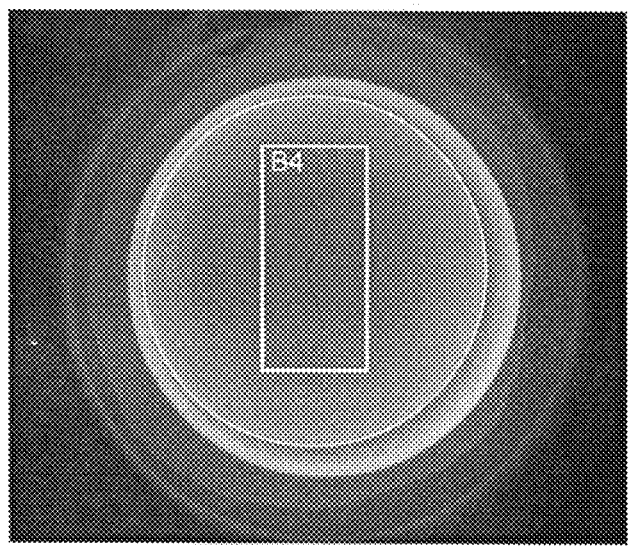
FIG. 17 shows an image of ophthalmic lens of a defective lens at the edge, captured using the inspection system in FIG. 1 that incorporates a Ultraviolet LED illumination module.
Figure 18:
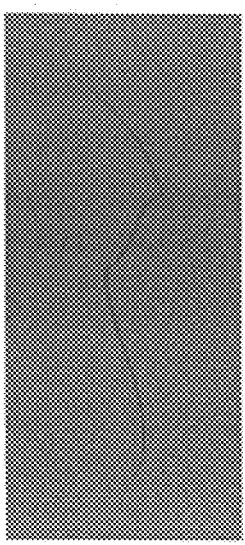
FIG. 18 shows an enlarged image of area B4 in FIG. 17.

FIG. 17 shows an image of the same ophthalmic lens of FIG. 15, but with the image captured using apparatus 100 as illustrated in FIG. 1. The area indicated by box B4 in FIG. 17 is shown enlarged in FIG. 18. The defect seen in box B4 of FIG. 18 appears like a probable crack appears like a prominent dark line when exposed to UV LED illumination utilized in apparatus 100. It is also evident that the line is continuous with high contrast, which results in the defect being reliably and repeatedly detected when analyzed by the inspection system.

Various modifications can be made without departing from the spirit of this invention or the scope of the appended claims. In view of the above, it will be seen that the several objects of the invention are achieved and other advantages are obtained. A person skilled in the art will be able to make many changes in the above apparatus and methods without departing from the scope of the invention. It is intended that all matter contained in the above description shall be interpreted as illustrative and not in a limiting sense.

The invention claimed is:
1. A method for detecting defects in a lens including lens material having fluorescent material therein comprising the steps of:
　illuminating said lens with light in a first spectrum designed to excite light emission by said lens material of light in a second spectrum;
　using a camera, capturing an image of said lens representative of the second spectrum of light caused by fluorescent emission of said lens material;
　positioning an optical filter between the camera and said lens for preventing the camera from picking up stray light and other spectrums of light;

exposing said lens to ultraviolet light to excite the fluorescent material in said lens, such that the fluorescent material appears white in said image captured by the camera;

analyzing pixels of said image to detect imperfections in said lens; and providing said image with visible indications of any imperfections detected in said lens material.

2. A method for detecting defects in the lens material therein as claimed in claim 1 further comprising outlining any imperfections in said digital image with a contrasting color.

3. A method for detecting defects in the lens material therein as claimed in claim 2 further comprising outlining any imperfections in said digital image greater than a predetermined area.

4. A method for detecting defects in the lens material therein as claimed in claim 2 further comprising outlining any imperfections in said digital image greater than a predetermined length.

\* \* \* \* \*